US011410057B2

(12) United States Patent
Ermans et al.

(10) Patent No.: US 11,410,057 B2
(45) Date of Patent: Aug. 9, 2022

(54) METHOD FOR ANALYZING A PREDICTION CLASSIFICATION IN A MACHINE LEARNING MODEL

(71) Applicant: NXP B.V., Eindhoven (NL)

(72) Inventors: Brian Ermans, 's-Hertogenbosch (NL); Wilhelmus Petrus Adrianus Johannus Michiels, Reusel (NL); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 400 days.

(21) Appl. No.: 16/795,774

(22) Filed: Feb. 20, 2020

(65) Prior Publication Data

US 2021/0264295 A1 Aug. 26, 2021

(51) Int. Cl.
*G06N 5/04* (2006.01)
*G06F 16/901* (2019.01)
*G06N 20/00* (2019.01)

(52) U.S. Cl.
CPC .......... *G06N 5/04* (2013.01); *G06F 16/9027* (2019.01); *G06N 20/00* (2019.01)

(58) Field of Classification Search
CPC . G06N 20/00; G06N 3/08; G06N 5/02; G06F 40/30; G06F 16/285; G06F 40/56; G06F 8/33; G06F 40/279
USPC .................... 706/12; 707/600, 737, 790, 797
See application file for complete search history.

(56) References Cited

U.S. PATENT DOCUMENTS 9,002,682 B2 * 4/2015 Kasabov ................ G16B 20/20 703/2
9,195,949 B2 11/2015 Kasabov
10,734,096 B1 * 8/2020 Neumann .............. G16B 40/20
2020/0218858 A1 * 7/2020 Sawyer ................ G06F 40/279
(Continued)

FOREIGN PATENT DOCUMENTS

WO 2010044683 A1 4/2010

OTHER PUBLICATIONS

Arras, Leila et al.; "Explaining Predictions of Non-Linear Classifiers in NLP;" Proceedings of the 1st Workshop on Representation Learning for NLP, Berlin, Germany, Aug. 11, 2016.
(Continued)

*Primary Examiner* — Hung T Vy
(74) *Attorney, Agent, or Firm* — Daniel D. Hill

(57) ABSTRACT

A method is provided for analyzing a classification in a machine learning model (ML). In the method, the ML model is trained using a training dataset to produce a trained ML model. One or more samples are provided to the trained ML model to produce one or more prediction classifications. A gradient is determined for the one of more samples at a predetermined layer of the trained ML model. The one or more gradients and the one or more prediction classifications for each sample are stored. Also, an intermediate value of the ML model may be stored. Then, a sample is chosen to analyze. A gradient of the sample is determined if the gradient was not already determined when the at least one gradient is determined. Using the at least one gradient, and one or more of a data structure, a predetermined metric, and an intermediate value, the k nearest neighbors to the sample are determined. A report comprising the sample and the k nearest neighbors may be provided for analysis.

20 Claims, 5 Drawing Sheets

(56) References Cited

U.S. PATENT DOCUMENTS

| | | | | |
|---|---|---|---|---|
| 2021/0104330 | A1* | 4/2021 | Neumann | G06N 5/003 |
| 2021/0166130 | A1* | 6/2021 | Neumann | G16H 40/67 |

OTHER PUBLICATIONS

Kim, Been et al.; "Examples are Not Enough, Learn to Criticize! Criticism for Interpretability;" Advances in Neural Information Processing Systems 29; Proceedings from the 30th Conference on Neural Information Processing Systems, Dec. 5-10, 2016, Barcelona, Spain.

Molnar, Christoph; Interpretable Machine Learning, A Guide for Making Black Box Models Explainable—4.7 Other Interpretable Models; Dec. 17, 2019; Downloaded at: https://christophm.github.io/interpretable-ml-book/other-interpretable.html.

Papernot, Nicolas et al.; "Deep k-Nearest Neighbors: Towards Confident, Interpretable and Robust Deep Learning;" arXiv.org>cs>arXiv:1803.04765; Submitted on Mar. 13, 2018.

Wallace, Eric et al.; "Interpreting Neural Networks with Nearest Neighbors;" Proceedings of the 2018 EMNLP Workshop BlackboxNLP: Analyzing and Interpreting Neural Networks for NLP; Brussels, Belgium, Nov. 1, 2018.

* cited by examiner

METHOD FOR ANALYZING A PREDICTION CLASSIFICATION IN A MACHINE LEARNING MODEL

BACKGROUND

Field

This disclosure relates generally to machine learning, and more particularly, to a method for analyzing a prediction classification in a machine learning (ML) model.

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of a ML algorithm, which includes the model's, accuracy, execution time, and storage requirements, is determined by several factors including the quality of the training data.

Trained ML models are often considered "black-boxes" by users of the models because there may be very little information available on the inner workings of the model. It would be useful to have information to help determine why an ML model makes certain predictions. For example, it may be useful to have a way to determine why an ML model mis-classifies an input sample. This would help a ML model designer produce a better training dataset that will result in ML models that can more accurately classify input samples.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
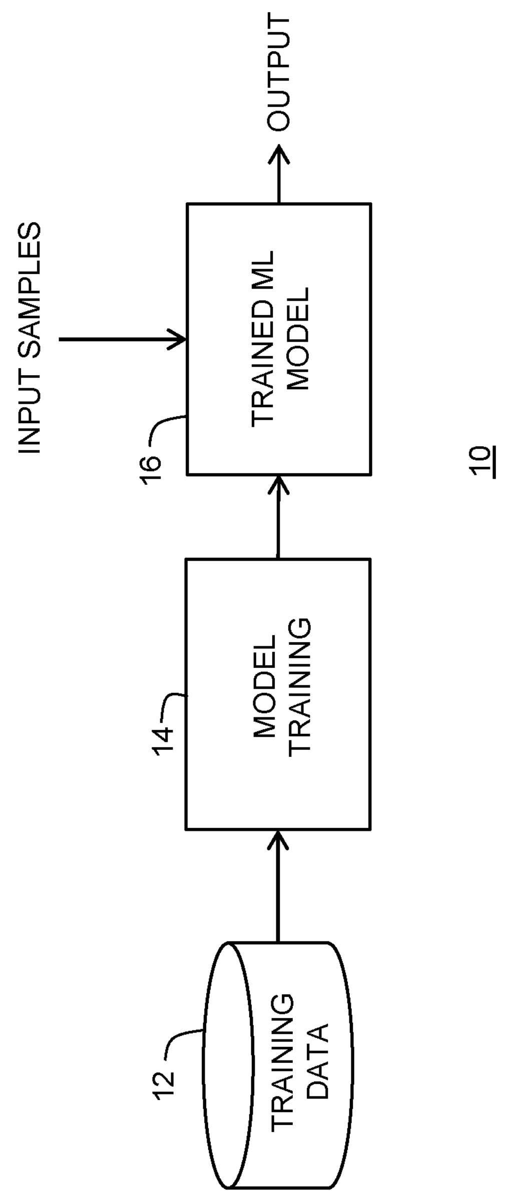
FIG. 1 illustrates a system for training a ML model.

Generally, there is provided, a method for analyzing a classification and the ML model that produced the classification. An ML model is trained with a training dataset having a plurality of samples to produce a trained ML model. The ML model may include a neural network. During inference operation of the trained ML model, one or more samples is input to the trained ML model to produce one or more prediction classifications. The one or more samples may be one or more of the plurality of samples. A gradient for the one or more samples is determined. The gradients can be used as an indication of how much a change in the weight or bias applied at a node of the ML model affects subsequent values. The gradients, prediction classification, and a correct classification for each sample may be stored. In addition, an intermediate value for each sample may be stored. The intermediate value is an output of an intermediate layer of the ML model. The intermediate value may be from any layer of the ML model. In the course of developing and training the ML model, or when using the model for inference predictions, it may become desirable to determine what caused a sample to be classified a certain way. To help determine why the sample was classified as it was, the sample may be chosen to be analyzed according to the described method. The sample may or may not be from the plurality of samples that were used to train the ML model. If the sample is not from the plurality of samples, then a gradient is calculated for the sample. Also, an intermediate value from one of the layers may be selected and combined with the gradient. The gradient and intermediate value may be combined using multiplication, addition, power off, or by any other method. The k nearest neighbors to the sample being analyzed is determined using the plurality of gradients, a data structure and a predetermined metric. The data structure may include a kNN (k nearest neighbors) algorithm, Kd-tree algorithm, R-tree algorithm, or the like. The predetermined metric may be a distance metric. The distance metric may be calculated by measuring a Lp-norm (Manhattan, Euclidean, etc.), by counting the number of shared non-zero values (Hamming distance), or by another method. The k nearest neighbors may be the nearest neighbors that have been misclassified and are in the same class as the sample being analyzed. Alternately, the k nearest neighbors may be from different classes, or may be boundary or edge samples that are misclassified and are very different from the sample being analyzed. A report may be generated that includes the sample being analyzed and the k nearest neighbors. The report may be used, for example, to determine why the sample was misclassified.

The gradients of samples are determined and mapped according to nearest neighbors. The gradients may be used in combination with the intermediate values for the samples. In the described embodiment, these gradients indicate how much a change in weight or bias affects the values predicted in a subsequent layer (typically the last convolutional layer) of a neural network (NN). The gradients are calculated based upon the error of a particular prediction classification for a sample compared to a more confident prediction for that classification. This provides insight into what elements of the network are causing the network to make a particular classification. If the predicted classification of a sample is as expected (the classification is correct), the direction and magnitude of change is calculated and compared to the k nearest neighbors using various metrics to learn how to produce a more confident prediction.

In one embodiment, the gradients for a sample are calculated from an intermediate layer of the ML model. The gradients for the sample may then be combined with an intermediate value of the sample for the same intermediate layer. The combination may be performed using multiplication, addition, or other method. The intermediate values give insight into the values the ML model produced for a particular sample. Using a combination of gradient and intermediate value gives insight in how other samples are similar to the sample being analyzed and how the ML model resolves to a particular classification for the samples. The combined gradient and intermediate value are mapped according to the k nearest neighbors.

The k nearest neighbors to a sample being analyzed may have a similar magnitude and direction of change (or, have similar gradients) and may contain similar features that cause a particular prediction classification. Looking at values of nearest neighbors that have a direct mapping to the prediction classification of the sample under investigation may provide the most relevant sample points for analysis. These gradients (a magnitude of change from an intermediate layer to a subsequent layer) may be calculated using back-propagation of the neural network and in the illustrated embodiment are calculated during the training process of a ML model to indicate in what direction the values should change for a better expected outcome (classification). After the training phase is done, gradients can be calculated for a specific prediction to determine what magnitude of change results in a more confident prediction for that classification (whether that prediction is wrong or correct), which can be used to determine what features contributed to the predicted classification. As used herein, the expected classification may include “ground-truth”.

In accordance with an embodiment, there is provided, a method for analyzing a classification in a machine learning model (ML), the method including: training the ML model using a training dataset having a plurality of samples to produce a trained ML model; inputting one or more samples to the trained ML model to produce one or more prediction classifications; determining a gradient of the one or more samples at a predetermined layer of the trained ML model; storing the one or more gradients and the one or more prediction classifications for each of the one or more samples; choosing a sample to analyze, wherein a gradient of the sample is determined if the gradient was not already determined when the gradient of the one or more samples is determined; determining, using the at least one gradient, a data structure, and predetermined metric, k nearest neighbors to the sample, where k is an integer; and generating a report comprising the sample and the k nearest neighbors. The data structure may include a kNN, Kd-tree, or R-Tree data structure. The at least one gradient may be calculated using one or more of the weights or biases of the predetermined layer. The predetermined metric may be a distance metric comprising one or more of a Manhattan distance, a Euclidean distance, or a hamming distance. Choosing a sample to analyze may further include choosing a sample that is misclassified by the trained ML model. Determining a gradient for the one or more samples at a predetermined layer of the trained ML model may further include determining a gradient for the one or more samples at a last convolutional intermediate layer. Generating a report may further include generating a report using Grad-CAM (gradient class-activation map). The k nearest neighbors may be the k nearest misclassified samples that share the same misclassification. The k nearest neighbors may be the k nearest samples having various different misclassifications. The method may further include combining the gradient of the one or more samples at the predetermined layer with an intermediate value of the predetermined layer. Choosing a sample to analyze may further include choosing a sample from the plurality of samples.

In another embodiment, there is provided, a method for analyzing a classification in a machine learning model (ML), the method including: training the ML model using a training dataset having a plurality of samples to produce a trained ML model; inputting one or more samples to the trained ML model to produce one or more predicted classifications; determining a gradient for the one or more samples at a predetermined layer of the trained ML model to produce a plurality of gradients; storing the one or more gradients and the one or more predicted classifications for each of the one or more samples; choosing a sample to analyze, wherein a gradient of the sample is determined if the gradient of the sample chosen to for analysis is not already determined; determining, using the one or more stored gradients, a data structure, and a distance metric, k nearest neighbors to the sample, where k is an integer, and wherein the k nearest neighbors comprise misclassified samples of the sample being analyzed; and generating a report comprising the sample, the distance metric, and the k nearest neighbors. The data structure may include a kNN, Kd-tree, or R-Tree data structure. The ML model may include a neural network. The predetermined metric may be a distance metric including one or more of a Manhattan distance, a Euclidean distance, or a hamming distance. Choosing a sample to analyze may further include choosing a sample that is misclassified by the trained ML model. Determining a gradient for the one or more samples at a predetermined layer of the trained ML model may further include determining a gradient for the one or more samples at a last convolutional layer. The method may further include combining the gradient of the one or more samples at the predetermined layer with an intermediate value of the predetermined layer. The k nearest neighbors may be the k nearest misclassified samples that share the same misclassification. Choosing a sample to analyze may further include choosing a sample from the plurality of samples.

FIG. 1 illustrates system 10 for training a ML model. System 10 includes a labeled set of ML training data 12, model training block 14, and resulting trained ML model 16. In one embodiment, system 10 is implemented as a computer program stored on a non-transitory medium comprising executable instructions.

One example embodiment includes a neural network (NN) algorithm used in the ML model to classify images. Various training datasets can be acquired to train an ML model, such as for example, the CIFAR10 data set. The CIFAR10 data set consists of 60K images, divided into a training set of 50K images (5K per class) and a test set of 10K images (1K per class).

Convolutional neural networks are well known. Generally, a neural network includes an input layer, one or more output layers, and one or more hidden layers between the input and output layers. Each layer can have any number of nodes, or neurons. Each of the nodes includes an activation function. There can be any number of hidden layers. Each hidden layer can include any number of nodes and concludes with a last hidden or intermediate layer before the output layers. There can be any number of output nodes in the output layer. An input sample is provided at the input layer and propagates through the network to the output layers. The propagation through the network includes the calculation of values for the layers of the neural network, including the intermediate values for the intermediate layers used by the described embodiments. Back propagation in the reverse direction through the layers is also possible and may be used to generate the gradients described herein. Weights and biases are applied at each of the nodes of the neural network. Generally, a weight at a node determines the steepness of the activation function and the bias at a node delays a triggering of the activation function. The calculated gradient at a node is related to the weights and bias. One or more output signals are computed based on a weighted sum of the inputs and outputs from the output nodes. The input and output connections of the nodes are weighted. Also, the activation functions may include non-linear activation functions. The activation functions, the weights, the biases, and the input to a node defines the output. Training the ML model with training dataset 12 results in trained ML model 16. Trained ML model 16 may then be used to classify input samples, labeled "INPUT SAMPLES" in FIG. 1 and output a classification of the input sample labeled "OUTPUT."

Even though a ML model might be carefully trained, the ML model may still make prediction mistakes. The method as described herein provides a method for further understanding the mechanisms behind prediction results provided by ML models.

Specifically, the method can help a ML model designer understand why a model made a prediction, either a correct prediction or an incorrect prediction. The information learned from the method can be used to compile better training data and to design better and safer systems with ML models.

In a convolutional neural network filters may be applied to a sample. These filters "extract" the important features of the sample and represent the important features as feature vectors that are used as input to the fully connected layers of the neural network. The fully connected layers then compute the output of the network. The outputs of a layer are fed to the inputs of a subsequent layer. The outputs may be from intermediate layers positioned between the input layers and output layers. The outputs of the intermediate layers can be changed by changing their weights and biases. Backpropagation may be used to calculate the magnitude of the change in the output layer of a network as a function of change in an intermediate layer. The magnitude of the change is a derivative function that is also known as the gradient. In one embodiment, the gradient of the last intermediate layer is used. In other embodiments, a different layer may be used. The analysis of a sample is done by taking the gradients calculated from the training dataset and finding the k closest examples, or nearest neighbors, with respect to a chosen metric. In another embodiment, the gradients of one layer are combined with the intermediate values of the same layer. The k nearest neighbors can be determined using various known algorithms such as kNN, R-tree, or Kd-tree. The k nearest neighbors can be presented for analysis in various ways as determined by the specific application. A report is one user interface for presenting the k nearest neighbors for analysis. Another example would be to present a short notification such as "It appears that many birds are misclassified as airplanes, would you like to further explore these examples?" Also, another example may be a report that lists all samples and k nearest neighbors found by using one particular filter. The use of the filter may be enhanced with a known interpretability method such as Grad-CAM (gradient class-activation map) or guided Grad-CAM.

Various filters can be used to select which samples are to be analyzed and presented to the user. In one filter, misclassified samples with neighbors that share the same prediction classification as the sample are of interest. These samples indicate that the individual sample is closely related with classified samples of another class. This may indicate that the sample being analyzed is underrepresented or just has a lot of features from another class. In another filter, a selection of k nearest neighbors may include misclassifications where the neighbors are of various different prediction classifications. This may indicate that the sample being analyzed is close to the decision boundary, or edge, or illustrates overlap between various classes. However, applying a filter to the misclassifications is not required. A user may choose to analyze all misclassifications, but in most cases, the most insightful misclassifications are expected to be found using a filter as described above.

The distance metric for deciding which samples are the k nearest neighbors can be calculated by measuring the Lp-Norm (e.g., Manhattan or Euclidean) by counting the number of shared non-zero values (Hamming distance), or any other method not mentioned. The distance metric can be used as another filter because finding the distance to other samples is how the k nearest neighbors are determined. For example, samples with a large distance to their neighbors are expected to be very atypical as they share few similarities with the calculated gradients. These atypical samples are of interest for understanding why these samples were misclassified. Depending on the implementation of the described method, the information gained from the method might be used by one skilled in the art to improve the training dataset and thereby improve the quality of the ML model. The method may be automated in a system that automatically applies functions such as data augmentation on samples found using the method, with the intent to improve performance of the network on these samples or the dataset in general.

Figure 2:
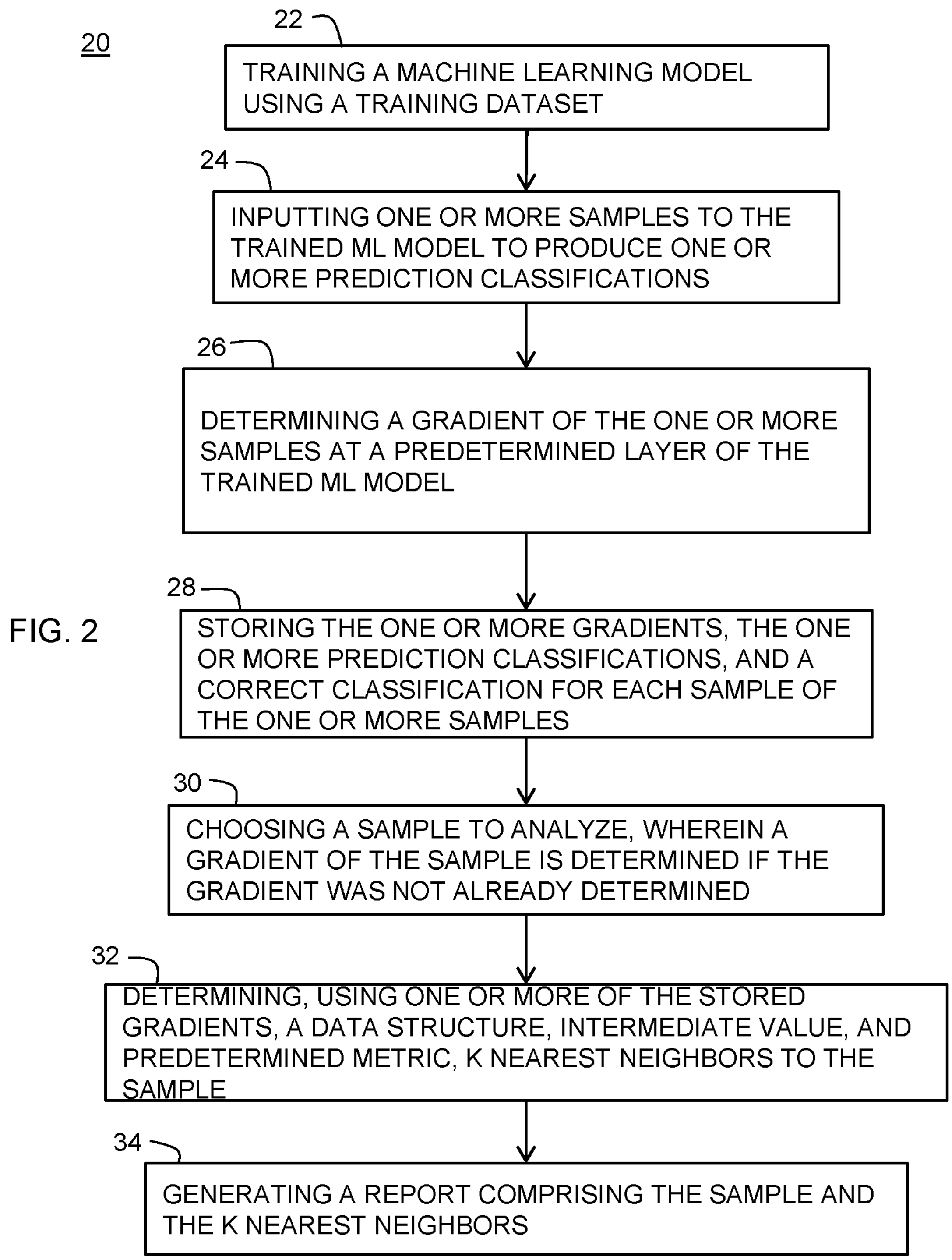
FIG. 2 illustrates a method for analyzing a classification in a ML model in accordance with an embodiment.

FIG. 2 illustrates method 20 for analyzing a classification in a ML model in accordance with an embodiment. Method 20 begins at step 22. At step 22, an ML model is trained using a training dataset such as training dataset 12 in FIG. 1 to produce a trained ML model. The ML model being trained may be trained to classify, for example, images. A plurality of images in training dataset 12 may be labeled and used in, for example, supervised learning of the ML model. After training, at step 24, one or more images are input to the trained ML model while in an inference operating mode, and a resulting one or more prediction classifications are collected. In another example embodiment, one or more intermediate values are collected at a predetermined intermediate layer of the trained ML model. The intermediate output values from the predetermined intermediate layer can be based on any layer of the neural network or any derivative of the network function. Alternatively, all the plurality of images of training dataset 12 may be input. At step 26, a gradient is determined for each input sample of the one or more samples at a predetermined layer of the trained ML model to produce one or more gradients. The gradients can be based on any layer of the neural network or any derivative of the neural network function. If combined with an intermediate value, the gradient and intermediate value are based on the same intermediate layer. The gradients may refer to the weights and/or biases of the intermediate layer. The gradients and intermediate values are used to determine one or more training samples that are the closest to the sample being analyzed. A filter may be applied so that the closest samples may be k nearest neighbors that are misclassified, the k nearest neighbors having any classification, all samples within a specific distance to the sample being analyzed, or all samples with a specific distance and a specific minimum or maximum distance to each other. Also, the distance may be calculated for a subset of the gradients and/or intermediate values, or the gradients and/or intermediate values may be normalized or clipped before calculations. In one embodiment, the predetermined layer is the last intermediate layer. At step 28, the plurality of gradients and/or intermediate values is stored. Also, the prediction classifications and the corresponding correct classifications for the plurality of images may be stored. The plurality gradients and other stored information can be used to analyze prediction results of selected samples that were produced by the ML model.

At step 30, a sample is chosen for analysis. The sample may have been misclassified and it is desired to gather information to determine why the sample was misclassified. The sample can be one of the above-mentioned plurality of samples used for training, or another sample. In the event the sample is not one of the plurality of samples, a gradient of the sample is first calculated. At step 32, the stored gradients, a data structure, an intermediate value (if chosen), and a predetermined metric are used to determine the k nearest neighbors to the sample under analysis, where k can be any integer. The data structure may include a kNN algorithm, a Kd-tree algorithm, or an R-tree algorithm. The predetermined metric may be a distance metric such as a Manhattan distance metric, Euclidean distance metric, or a Hamming distance metric. At step 34, a report is generated that includes the sample being analyzed, and the k nearest neighbors. If the method is used on the output of a convolutional layer, the average output of every individual filter (such as the distance metric and data structure) can be used instead of the location dependent outputs of the filter. Using an average of the output from a filter matches samples based on location-invariant similarities. This is known as "pooling." There are other ways this can be done, such as maximum pooling, where the maximum output of the filters is used. A designer of the ML model may use the report to determine, for example, why a sample was classified the way it was.

Figure 3:
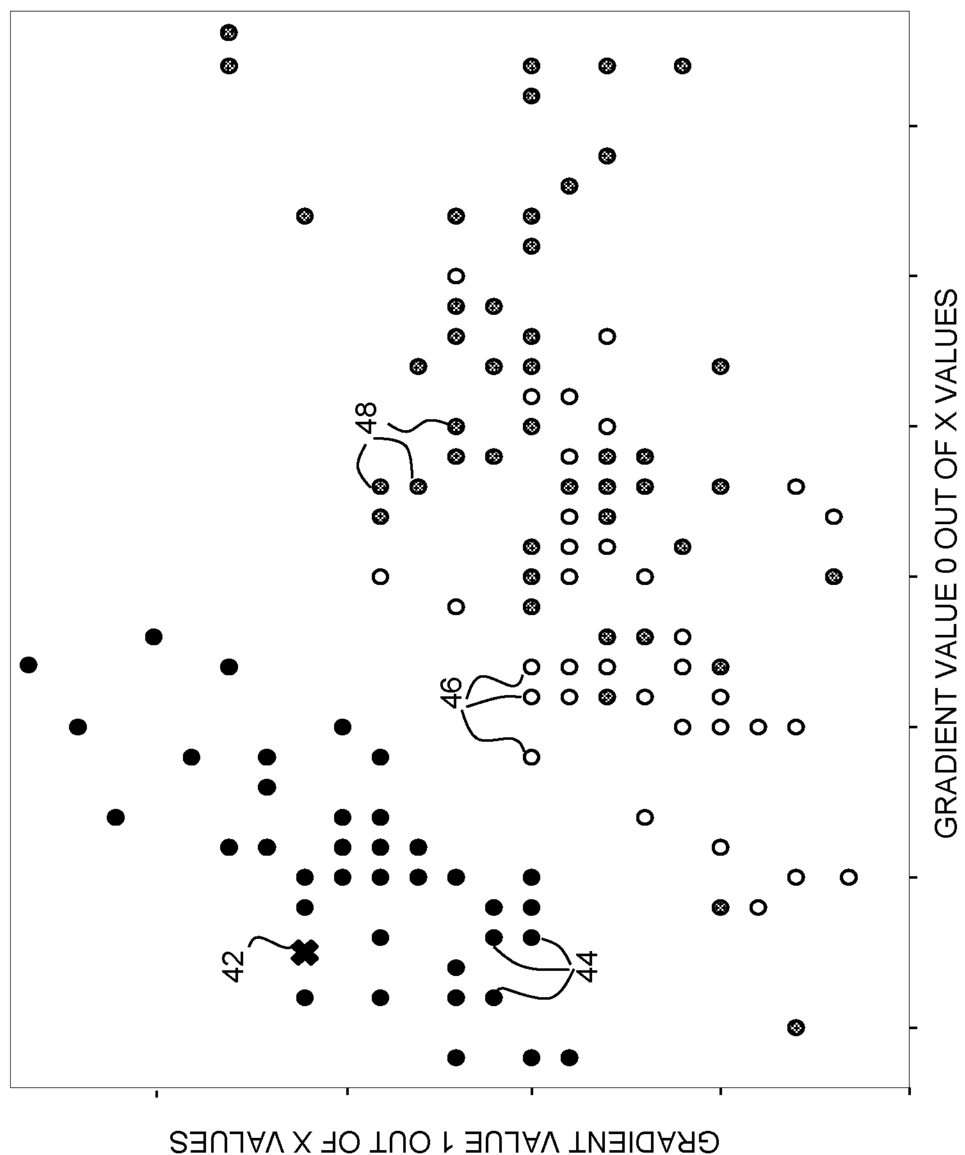
FIG. 3 illustrates a plot of classification results for a misclassified sample that shares a prediction with k nearest neighbors.

FIG. 3 illustrates a plot of classification results for a misclassified sample that shares a prediction with k nearest neighbors as determined using the described method. The plot in FIG. 3 is a plot of gradient value 1 out of X values versus gradient value 1 out of X values, where X is the number of samples used in the analysis. A sample 42 (black X) is a sample being analyzed and was a misclassification. Solid black circles represent samples (samples 44 are representative examples) of one classification and are the same classification as sample 42. In one embodiment, samples 44 may be the k nearest neighbors with sample 42, where the nearest neighbors are chosen to be of the same classification and k equals 38. Samples 46 (white circles) and samples 48 (cross-hatched circles) represent other classifications. In FIG. 3, sample 42 is a misclassification, but shares its misclassification with the classification of the k nearest neighbors. This may indicate that sample 42 is a very typical example of the class in which sample 42 was classified. Alternately, this could indicate a mislabeling or an atypical example of its class. A more detailed study of the samples and features of the samples that produced the classification results may provide the answer to the misclassification.

Figure 4:
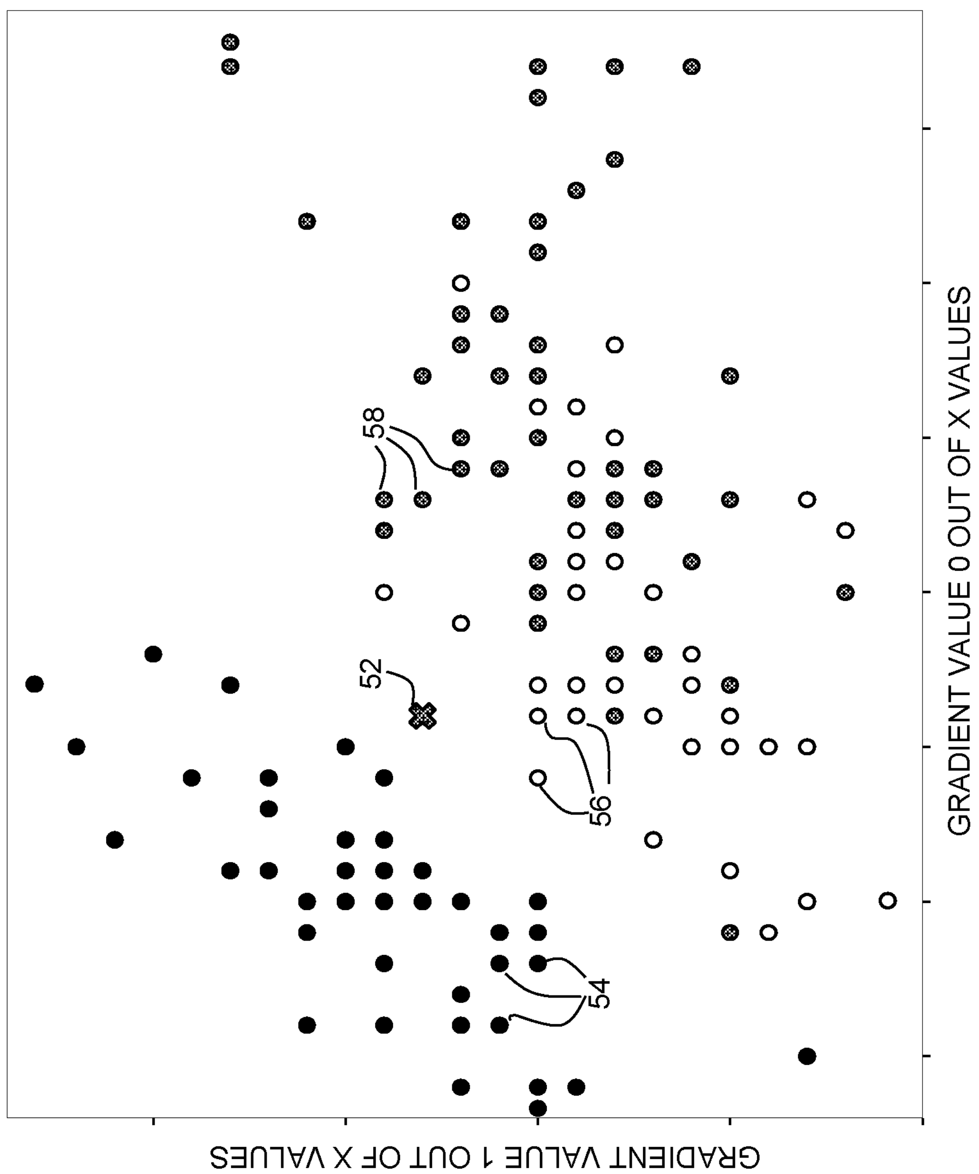
FIG. 4 illustrates a plot of classification results for a misclassified sample that is on a decision boundary (edge-case) with k nearest neighbors.

FIG. 4 illustrates a plot of classification results for a misclassified sample that is on a decision boundary (edge-case) for k nearest neighbors. The plot in FIG. 4 is a plot of gradient value 1 out of X values versus gradient value 1 out of X values where X is the number of samples used in the analysis. A sample 52 (cross-hatched X) is misclassified. As can be seen in the plot, sample 52 falls on a boundary between samples of different classifications such as samples 54 (black circles) and samples 56 (white circles) and samples 58 (cross-hatched circles). Samples 54, 56, and 58 having different prediction classifications. This illustrates an edge-case, where sample 52 is within a prediction boundary. Edge-cases as illustrated in FIG. 4 may have particular interest for safety critical applications such as autonomously driven vehicles because edge-cases may result in indecision and inconsistency in the model classification predictions.

Figure 5:
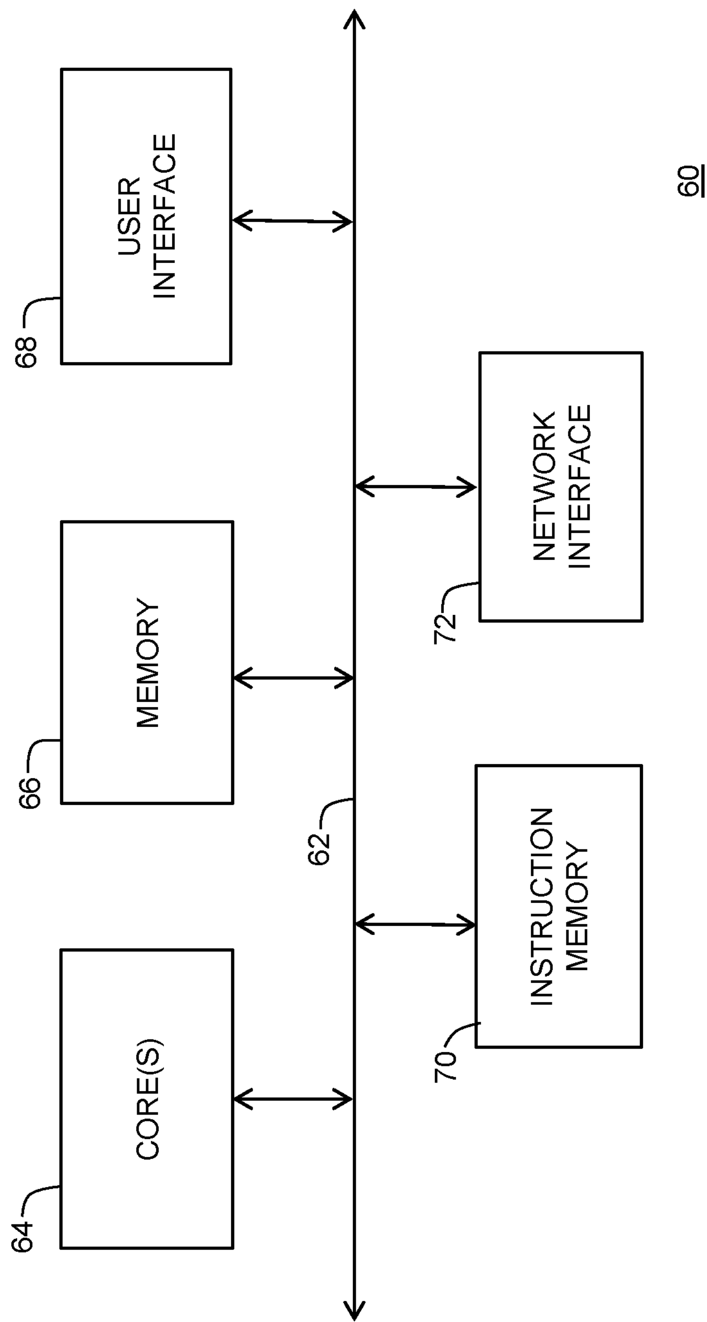
FIG. 5 illustrates a processor useful for implementing the method of FIG. 2 in accordance with an embodiment.

FIG. 5 illustrates processor 60 for use in implementing the system of FIG. 1 in accordance with an embodiment. Data processing system 60 may be implemented on one or more integrated circuits and may be used in an implementation of the described embodiments. Data processing system 60 includes bus 62. Connected to bus 62 is one or more processor cores 64, memory 66, user interface 68, instruction memory 70, and network interface 72. The one or more processor cores 64 may include any hardware device capable of executing instructions stored in memory 66 or instruction memory 70. For example, processor cores 64 may execute the machine learning algorithms used for training and operating the ML model. Processor cores 64 may be, for example, a microprocessor, field programmable gate array (FPGA), application-specific integrated circuit (ASIC), or similar device. Processor cores 64 may be implemented in a secure hardware element and may be tamper resistant.

Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. In one embodiment, memory 66 is used to store weight matrices for the ML model.

User interface 68 may be connected to one or more devices for enabling communication with a user such as an administrator. For example, user interface 68 may be enabled for coupling to a display, a mouse, a keyboard, or other input/output device. Network interface 72 may include one or more devices for enabling communication with other hardware devices. For example, network interface 72 may include, or be coupled to, a network interface card (NIC) configured to communicate according to the Ethernet protocol. Also, network interface 72 may implement a TCP/IP stack for communication according to the TCP/IP protocols. Data samples for classification may be input via network interface 72, or similar interface. Various other hardware or configurations for communicating are available.

Instruction memory 70 may include one or more machine-readable storage media for storing instructions for execution by processor cores 64. In other embodiments, both memories 66 and 70 may store data upon which processor cores 64 may operate.

Memories 66 and 70 may also store, for example, encryption, decryption, and verification applications. Memories 66 and 70 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for analyzing a classification in a machine learning model (ML), the method comprising:
- training the ML model using a training dataset having a plurality of samples to produce a trained ML model;
- inputting one or more samples to the trained ML model to produce one or more prediction classifications;
- determining a gradient of the one or more samples at a predetermined layer of the trained ML model;
- storing the one or more gradients and the one or more prediction classifications for each of the one or more samples;
- choosing a sample to analyze, wherein a gradient of the sample is determined if the gradient was not already determined when the gradient of the one or more samples is determined;
- determining, using the at least one gradient, a data structure, and predetermined metric, k nearest neighbors to the sample, where k is an integer; and
- generating a report comprising the sample and the k nearest neighbors.

2. The method of claim 1, wherein the data structure comprises a kNN, Kd-tree, or R-Tree data structure.

3. The method of claim 1, wherein the at least one gradient is calculated using one or more of the weights or biases of the predetermined layer.

4. The method of claim 1, wherein the predetermined metric is a distance metric comprising one or more of a Manhattan distance, a Euclidean distance, or a hamming distance.

5. The method of claim 1, wherein choosing a sample to analyze further comprises choosing a sample that is misclassified by the trained ML model.

6. The method of claim 1, wherein determining a gradient for the one or more samples at a predetermined layer of the trained ML model further comprises determining a gradient for the one or more samples at a last convolutional intermediate layer.

7. The method of claim 1, wherein generating a report further comprises generating a report using Grad-CAM (gradient class-activation map).

8. The method of claim 1, wherein the k nearest neighbors are the k nearest misclassified samples that share the same misclassification.

9. The method of claim 1, wherein the k nearest neighbors are the k nearest samples having various different misclassifications.

10. The method of claim 1, further comprising combining the gradient of the one or more samples at the predetermined layer with an intermediate value of the predetermined layer.

11. The method of claim 1, wherein choosing a sample to analyze further comprises choosing a sample from the plurality of samples.

12. A method for analyzing a classification in a machine learning model (ML), the method comprising:
- training the ML model using a training dataset having a plurality of samples to produce a trained ML model;
- inputting one or more samples to the trained ML model to produce one or more predicted classifications;
- determining a gradient for the one or more samples at a predetermined layer of the trained ML model to produce a plurality of gradients;
- storing the one or more gradients and the one or more predicted classifications for each of the one or more samples;
- choosing a sample to analyze, wherein a gradient of the sample is determined if the gradient of the sample chosen to for analysis is not already determined;
- determining, using the one or more stored gradients, a data structure, and a distance metric, k nearest neighbors to the sample, where k is an integer, and wherein the k nearest neighbors comprise misclassified samples of the sample being analyzed; and
- generating a report comprising the sample, the distance metric, and the k nearest neighbors.

13. The method of claim 12, wherein the data structure comprises a kNN, Kd-tree, or R-Tree data structure.

14. The method of claim 12, wherein the ML model includes a neural network.

15. The method of claim 12, wherein the predetermined metric is a distance metric comprising one or more of a Manhattan distance, a Euclidean distance, or a hamming distance.

16. The method of claim 12, wherein choosing a sample to analyze further comprises choosing a sample that is misclassified by the trained ML model.

17. The method of claim 12, wherein determining a gradient for the one or more samples at a predetermined layer of the trained ML model further comprises determining a gradient for the one or more samples at a last convolutional layer.

18. The method of claim 12, further comprising combining the gradient of the one or more samples at the predetermined layer with an intermediate value of the predetermined layer.

19. The method of claim 12, wherein the k nearest neighbors are the k nearest misclassified samples that share the same misclassification.

20. The method of claim 12, wherein choosing a sample to analyze further comprises choosing a sample from the plurality of samples.

* * * * *